United States Patent [19]

Habib

[11] 3,958,491

[45] May 25, 1976

[54] MACHINE TOOL

[76] Inventor: Robert Habib, 36, Quai Gustave Ador, 1200 Geneva, Switzerland

[22] Filed: Aug. 16, 1974

[21] Appl. No.: 498,127

[30] Foreign Application Priority Data

Sept. 11, 1973 Switzerland.................... 13011/73
Nov. 19, 1973 Switzerland.................... 16223/73

[52] U.S. Cl. ................................. 90/16; 90/17; 51/166 MH
[51] Int. Cl.² ........................ B23C 1/12; B24B 7/00
[58] Field of Search................... 90/17, 16, 11 R; 51/166 MH, 166 T; 408/234

[56] References Cited
UNITED STATES PATENTS

| | | | |
|---|---|---|---|
| 2,629,210 | 2/1953 | Robinson | 51/166 MH |
| 2,744,450 | 5/1956 | Walter | 90/17 X |
| 3,380,347 | 4/1968 | Habib | 90/17 |

*Primary Examiner*—Gil Weidenfeld
*Attorney, Agent, or Firm*—Robert E. Burns; Emmanuel J. Lobato; Bruce L. Adams

[57] ABSTRACT

A universal sharpening, grinding and milling machine comprises a horizontal table having a vertical column mounted for a limited vertical and horizontal movement relative to the table. A tool-carrying head including a shaft carrying tools at both ends and a motor for driving the shaft can be removably mounted on the column in selected angular positions about the axis of a tie-bolt by which the head is mounted, and with either of two opposed faces of the head facing the column. The tools are spaced by different distances from said tie bolt axis, and the axis of the shaft is spaced by different distances from the opposed faces of the head, whereby the possibilities of positioning a tool relative to the table are increased for limited paths of movement between the column and table. An auxiliary table can be provided to facilitate turning about the tool-carrying head, and vertical movement of the column can be provided by a pawl-and-ratchet device controlled by rocking a crank.

8 Claims, 11 Drawing Figures

MACHINE TOOL

The invention relates to machine tools, such as universal sharpening, grinding and milling machines of the general type including a table and a vertical column able to move horizontally and vertically in relation to one another, a tool-carrying head secured on the column, this head being able to pivot by 360° about a horizontal axis and carrying a motor driving a shaft able to receive a tool at each of its ends.

In machine tools of this type, if it is desired to increase the possibilities of movement of the tools, it is of course possible to increase the path of movement of the column in relation to the table, both in the vertical direction and the horizontal direction, but this involves an increase in the dimensions of the machine. Longer paths also involve a reduction of the rigidity and stability which must be compensated by larger sections so that the weight, bulk and cost of the machine increase.

An aim of the invention is therefore to increase the possibilities of positioning the tools in relation to the table without increasing the horizontal and vertical movement of the column.

According to the invention, a machine tool comprises a table and a vertical column adapted for movement relative to one another horizontally and vertically, and a tool-carrying head. The head includes a shaft adapted at each of its ends to receive a tool, and a motor for driving the shaft, and further has two opposed outer faces parallel to the shaft. Means are provided for removably securing the tool-carrying head on the column in selected angular positions about a horizontal pivoting axis perpendicular to said opposed faces with either of said opposed faces facing a cooperating face of the column. The ends of the shaft are spaced apart by different distances from a plane perpendicular to the axis of the shaft and passing through said pivoting axis.

Preferably, the perpendicular distances from the shaft to said two opposed faces are different.

According to another preferred feature, the column can be rotated about a longitudinal axis thereof relative to the table, and said pivoting axis does not intersect said longitudinal axis.

The advantage of these arrangements is to enable modification of the relative position of the tools in relation to the table, both in the transverse and vertical directions, by simply changing over the face of the tool-carrying head which coacts with the cooperating face of the column, possibly with a pivoting of 180° of the head about its pivoting axis, thus enabling a limitation of the transversal and vertical movement of the column in relation to the table.

However, manually turning around the tool-carrying head requires a substantial effort by the operator in view of the relatively great weight of the tool-carrying head (which may be in the region of 20 kg), and the position of the tool-carrying head relative to the table since even in the lowermost position of the column the tool-carrying head is at certain distance from the table. To facilitate this turning-around operation, the machine tool is advantageously equipped with an auxiliary removable table having a thickness corresponding to at least the distance between the main or working table and a plane face of the tool-carrying head considered at the lowermost position of the vertical column, and means for positioning said auxiliary table in relation to the working table.

The accompanying schematic drawings show, by way of example, an embodiment of the invention. In the drawings.

With reference to FIGS. 1 to 6, on a frame 1 is mounted a transverse slide 2 in which is fixed a column guide 3 in which a sub-column 4 is mounted for a limited vertical sliding movement over a path of for example 200 millimeters. The transverse slide 2 is slidable on the frame 1 in usual manner as illustrated for example in U.S. Pat. No. 3,316,613. Hence the sub-column 4 may move horizontally with the transverse slide 2 according to the direction of double-headed arrow F1, along a limited path of for example 180 millimeters. The sub-column 4 has a cylindrical base and may be turned through 360° about its axis 5, by known means, not shown. The sub-column 4 is extended upwardly by a hollow asymmetric column 6 having a circular support 7 pierced by a horizontal bore 8 spaced apart by a distance $a$ from the axis 5 of the column. The support 7 is provided with a graduated guide ring 21.

Figure 1:
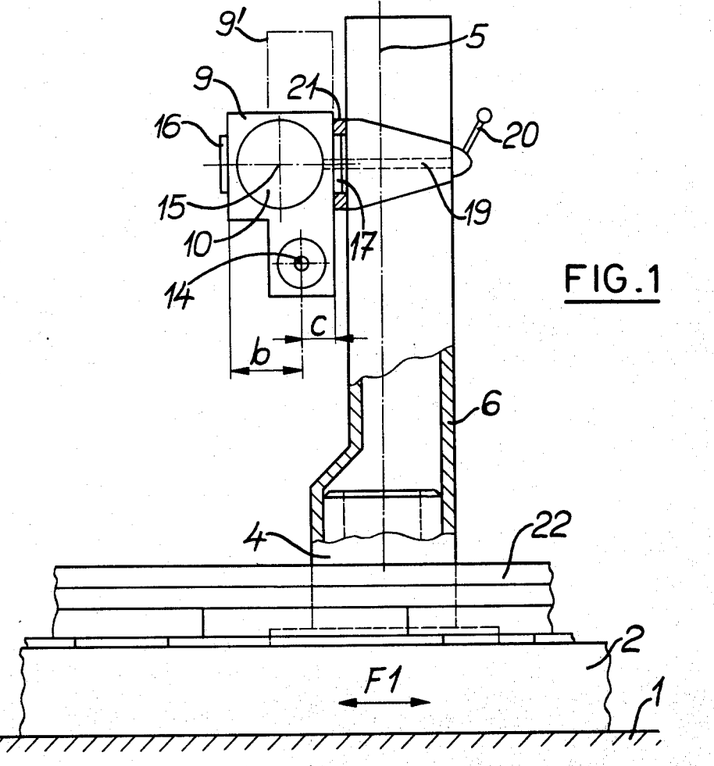
FIG. 1 is a front elevation, partly in cross-section, of a machine tool according to the invention.

In the example shown, the column 6 carries a grinding-wheel-carrying head 9 including a motor 10 driving, by a belt 11 (FIG. 6), two grinding wheels 12 and 13. The axis 14 of the shaft carrying grinding wheels 12, 13 is not situated in the central vertical plane passing through the axis 15 of motor 10, but the head 9 has two opposed parallel outer faces and the axis 14 of the grinding wheels is at a distance $b$, $c$ respectively from these two faces. On each of these faces is secured a centring disc 16, 17 respectively having at its centre a tapped bore 18 (FIG. 6) enabling securing of the head 9 on the support 7 of the pillar by means of a rod 19 having a threaded end which screwably engages in bore 18. The screwing of rod 19 to grip or release the head 9 is controlled by a handle 20. The centring disc 16 or 17 engages without play in a recess formed by a graduated guide ring 21 but is able to turn in this guide ring when rotation about rod 19 is not prevented by tightening by means of handle 20. FIG. 1 shows the head 9 secured to the pillar 6 on the side of its centring disc 17, whereas FIG. 4 shows the head 9 on the side of its centring disc 16.

Figure 6:
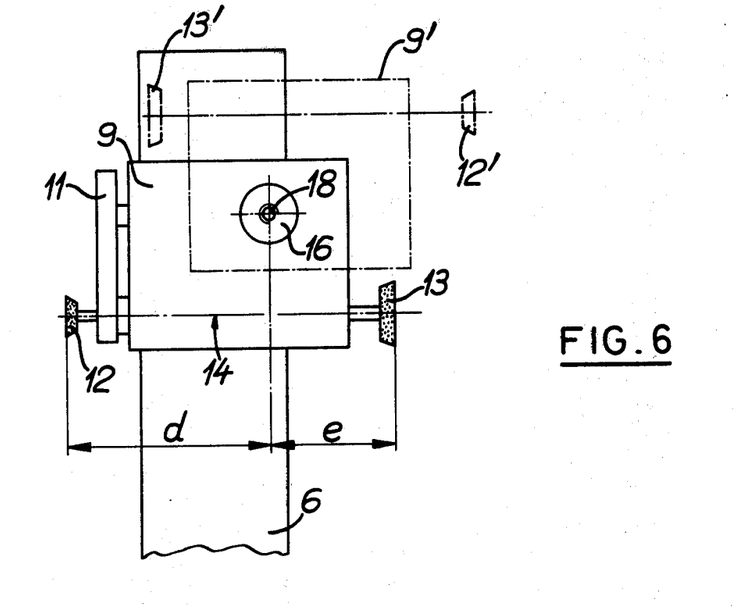
FIG. 6 is a front elevation of the tool-carrying head and column.

The head 9 can pivot about the horizontal rod 19 by 360°, and can be set in any selected position by handle 20. FIGS. 4 and 6 show the position occupied by the head 9 after turning over and pivoting by 180° relative to the position of FIG. 1. It can also be seen in FIG. 6 that the distances d and e of the grinding wheels 12, 13 from the perpendicular plane passing the pivoting axis of head 9 are different.

Figure 2:
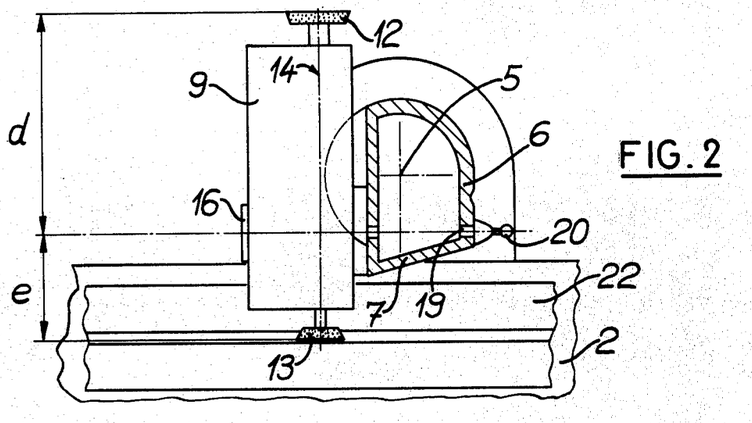
FIG. 2 is a plan view thereof, partly in cross-section.
Figure 3:
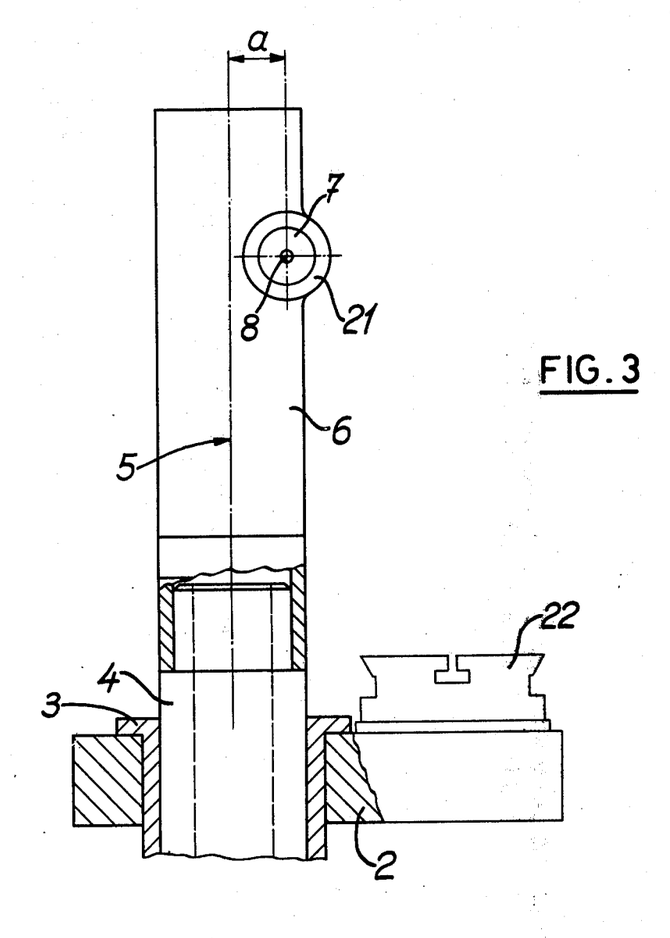
FIG. 3 is a side elevational of the column and table, partly in cross-section.
Figure 4:
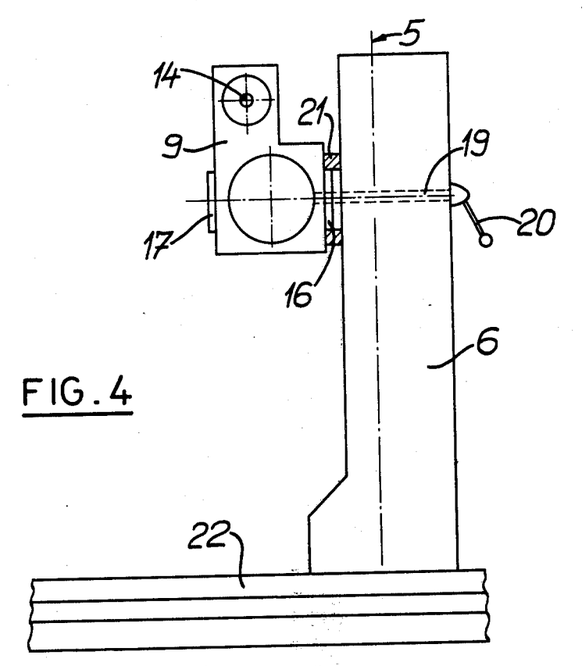
FIG. 4 is a side elevation showing the tool-carrying head secured in another manner.
Figure 5:
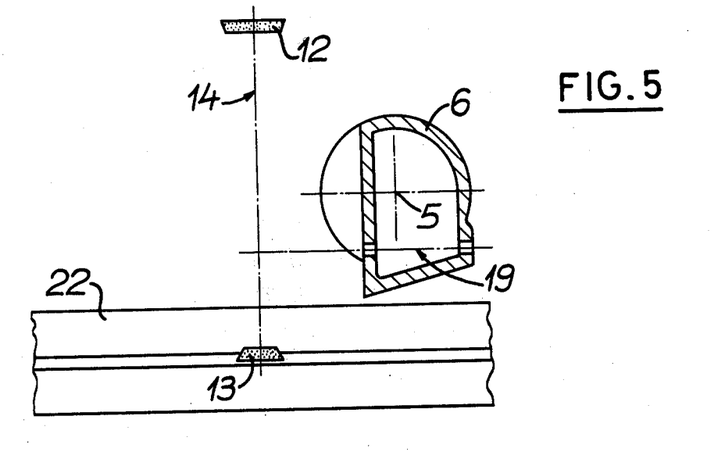
FIG. 5 is a simplified plan view corresponding to FIG. 2, but with the tool-carrying head in the position of FIG. 4.

FIGS. 2 and 5 show in plan two positions of the grinding wheels 12, 13, corresponding respectively to securing the grinding-wheel-carrying head according to FIGS. 1 and 4, relative to the working table 22 which in usual manner is mounted on a longitudinal slide of the machine.

Figure 7:
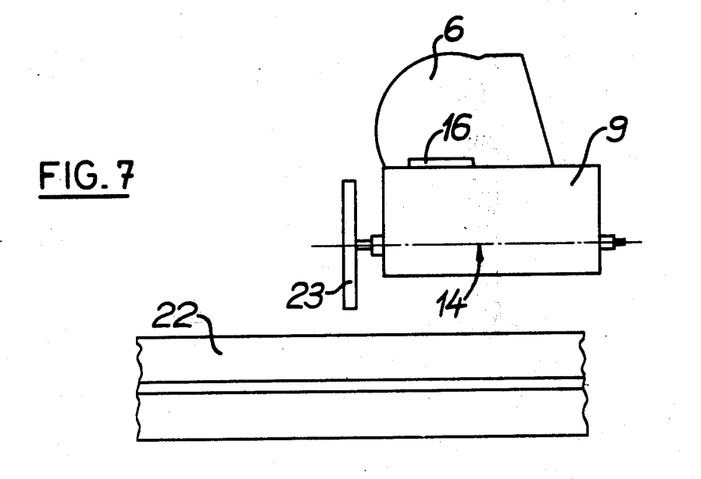
FIG. 7 is a plan view with the machine tool set for grinding.

The positions of the grinding wheels 12, 13 shown in FIGS. 1 to 6 are generally positions for sharpening. The position of a single flat grinding wheel 23 shown in FIG. 7 is generally a position for precision grinding (i.e. for correction or calibration) in which use is made of the short part a of the grinding-wheel-carrying shaft in the lower position, the head 9 being secured to the column by its disc 16, which enables centring of the grinding wheel along the longitudinal path of the table. It can also be seen that in this grinding position, grinding wheels of smaller diameter can be used by virtue of the reduced value of the distance c (FIG. 1).

Generally speaking, due to the possibilities of securing the tool carrying head to the column, the difference of distances d and e and the difference of the distances b and c, it is possible to bring one or the other of the grinding wheels into a desired position relative to the table with a reduced displacement of the column, both vertically and horizontally, which enables increasing the possibilities of existing machines without it being necessary to increase their size and without causing prejudice to the stability of the machine, i.e. to the precision of the machine.

Figure 8:
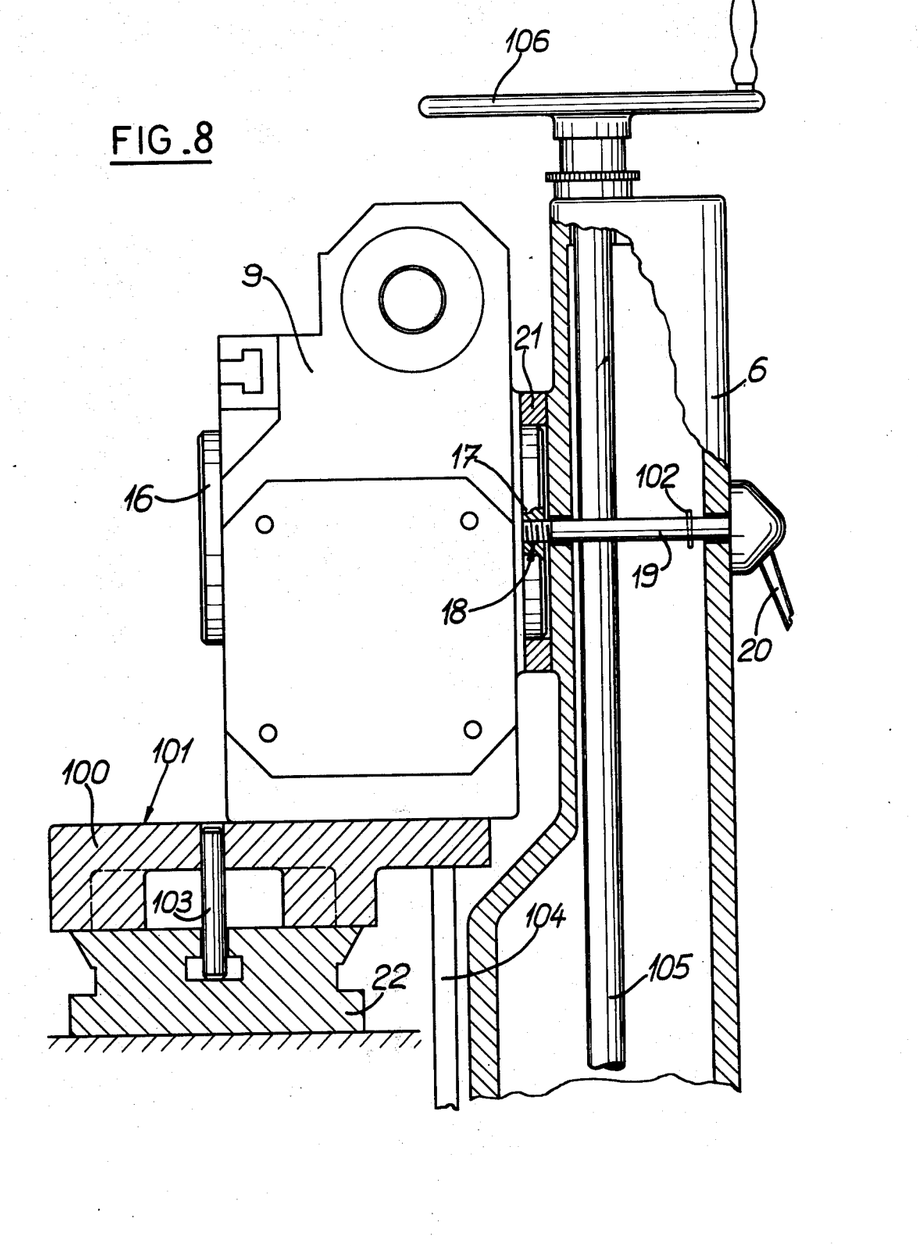
FIG. 8 is a schematic elevational view, partially in cross-section, of a machine tool according to the invention including an auxiliary table placed between the tool-carrying head and the main or working table.

Reference is made to FIG. 8 which shows the tool-carrying head 9 secured on its column 6 by its disc 17.

To change over the tool-carrying head 9 from one bearing face to the other, the rod 19 must be unscrewed by means of handle 20, the head 9 disengaged from the column and pivoted by 180° about a vertical axis in order to place the second disc 16 facing the support. To facilitate this operation, there is provided an auxiliary removable table 100 that the operator places between the main or working table 22 and the tool-carrying head 9 before disengaging the latter. This auxiliary table 100 is provided to support the head 9 once it is completely disengaged from the column and the rotation by 180° of the head 9 about a vertical axis can be carried out by taking support on this auxiliary table 100.

The auxiliary table 100 includes an upper plane surface 101. Means for positioning and supporting the auxiliary table 100 in relation to working table 22 are provided in the form of two retaining pins 103 disposed in a longitudinal groove of the working table 22 and two legs 104 which rest on the frame of the machine.

To enable rotation of the tool-carrying head 9 by 180° about a vertical axis, the head 9 bears on auxiliary table 100 by its largest planar face, i.e. with the motor and shaft disposed uppermost.

The disc 17 is fitted without play in the graduated ring 21 and is difficult to remove from this ring simply by pulling on the tool-carrying head 9.

To carry out this disengagement, a very simple extraction device is provided. A pin 102 is driven in the tie bolt or rod 19 at a location spaced apart by about 1 to 2 mm from the inner wall of column 6 so that when the rod 19 is unscrewed, pin 102 rapidly comes to abut against the column. Since the rod 19 can no longer move longitudinally, the disc 17, tapped at 18, is pushed out of the graduated ring 21. Instead of a pin, it is possible to employ other forms of stop.

To move the column 6 and consequently the tool-carrying head 9 vertically, the operator acts on a vertical screw which in conventional manner cooperates with a nut fixed in the slide 2 and which is extended by a shaft 105 controlled in the usual manner by a hand-wheel 106. However, in view of the position of this hand wheel 106 at the upper end of the column 6, the turning thereof is not always very convenient especially if the operator is sitting down, and for this reason the invention proposes an alternative form of accessory device to facilitate this manoeuvre, shown in FIGS. 9 to 11.

Figure 9:
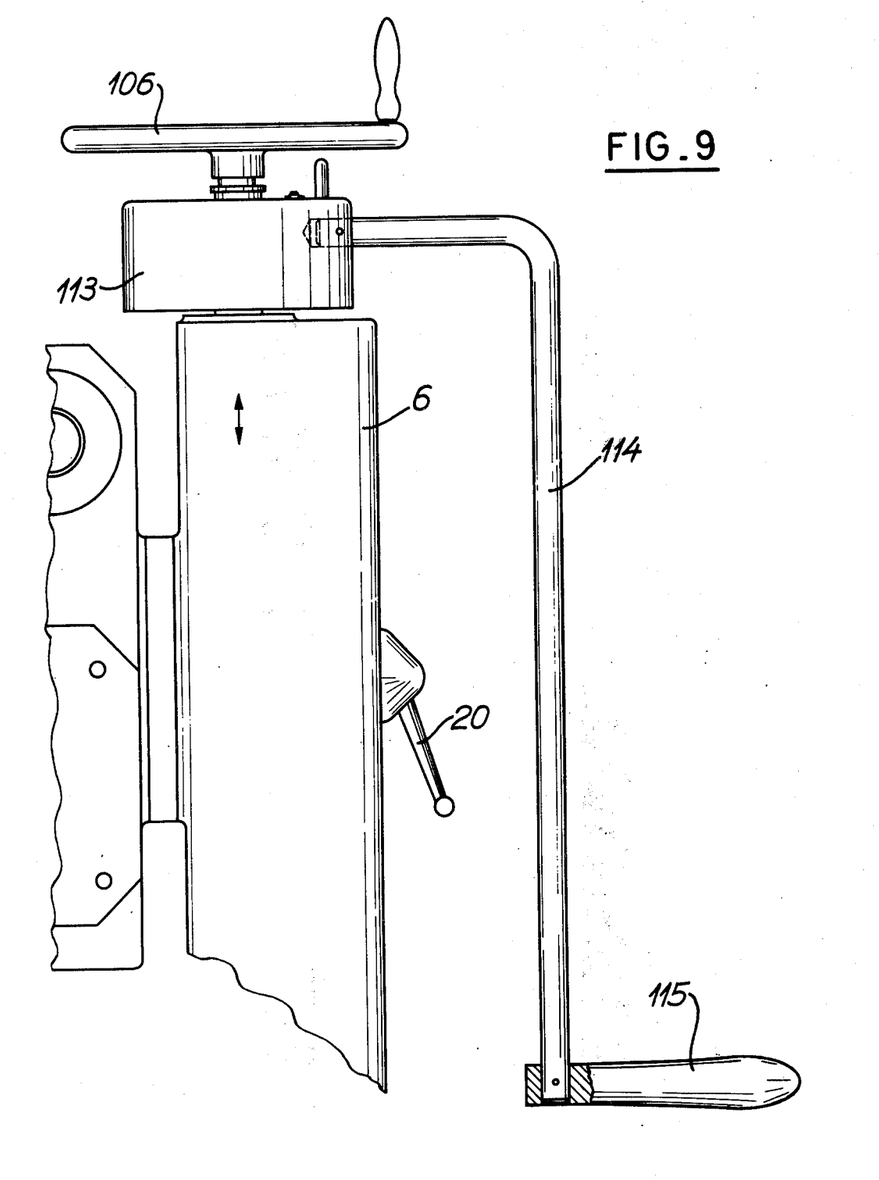
FIG. 9 is a schematic elevational view of a varied embodiment of a device for controlling vertical movement of the column.
Figure 10:
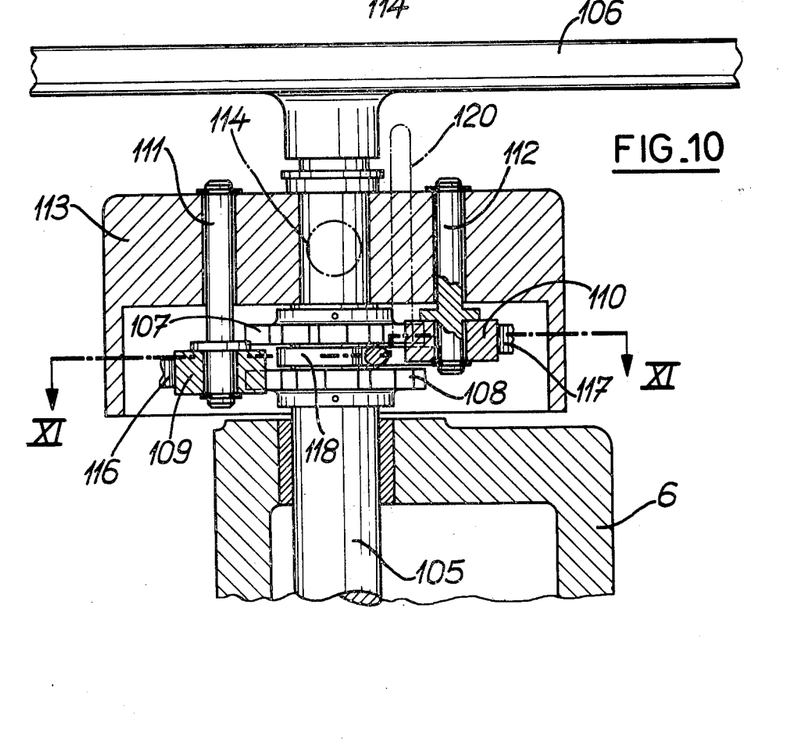
FIG. 10 is a cross-section taken along line X—X of FIG. 11 through the upper end of the column of FIG. 9, showing a pawl-operated device for controlling vertical movement of the column.
Figure 11:
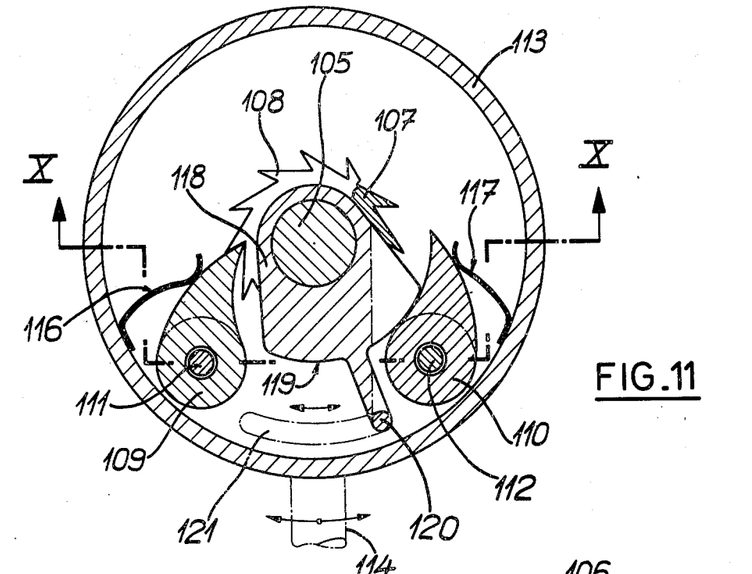
FIG. 11 is a cross-section of the pawl-operated control device taken along line XI—XI of FIG. 10.

At the upper end of shaft 105 are keyed two spaced-apart ratchet wheels 107, 108 with oppositely-directed teeth, one serving to turn the shaft 105 in a direction to raise the column, and the other in the direction for lowering. In the vicinity of these ratchet wheels are disposed respective driving pawls 109, 110 mount on pins 111, 112 fixed in a hollow cylindrical piece 113 freely mounted on a shoulder of the shaft 105. This piece 113 may be rotatably reciprocated about shaft 105 by means of a fixed crank 114 provided at its lower end with a handle 115 which the operator rocks to-and-fro about the axis of shaft 105. The pawls 109, 110 pivoted about their respective pin 111, 112 are constantly urged by return biasing springs 116, 117 secured on piece 113 by means of screws. A pivotally mounted selection cam 118, able to occupy two extreme positions and whose operative face 119 has a curvature corresponding to the curvature of the inner faces of pawls 109, 110, is freely mounted on shaft 105 between the two ratchet wheels 109, 110 in a manner such that its operative face 119 is situated between the two ratchet wheels 109, 110 to be able to selectively engage with either one of these ratchet wheels. Cam 118 is provided with a cranked control rod 120 which passes through an arcuate slot 121 in the hollow piece 113 and which may be moved to either end of the slot by the operator, by actuation from the upper face of part 113, so as to determine, by selectively placing one of the pawls out of contact with its ratchet wheel, the direction of rotation of shaft 105 and consequently the raising or lowering of column 6 in response to a to-and-fro rocking movement of handle 115 and piece 113. The operator can carry out this movement, which in practice is relatively frequently repeated, while remaining in a convenient sitting down position.

In the case of control of the raising or lowering of the column 6 by hand wheel 106, the cam 118 is placed in an intermediate position in which the two pawls are simultaneously disengaged from their respective ratchet wheels, the shape of the ends of the operative face 119 of the cam being specially designed to permit this double disengagement.

Instead of the pawl device shown, it is possible to employ any other selective unidirectional driving device, notably friction-operated. Also, the crank 114 could be actuated by other means, for example by a pedal, or automatically.

What is claimed is:

1. A machine tool comprising: a working table and a vertical column movable relative to one another horizontally and vertically; a tool-carrying head including a shaft having first and second ends, means at each of said first and second ends of the shaft for mounting a tool, and motor means for driving the shaft, the tool-carrying head having two opposed outer faces parallel to the shaft; and means for removably securing the tool-carrying head on the column in selected angular positions about a horizontal pivoting axis perpendicular to said opposed faces with either of said opposed faces facing a cooperating face of the column, said first and second ends of the shaft being spaced apart by different distances from a plane perpendicular to the axis of the shaft and passing through said pivoting axis.

2. A machine tool as claimed in claim 1, in which the perpendicular distances from the shaft to said two opposed faces are different.

3. A machine tool as claimed in claim 2, in which the column is rotatable about a longitudinal axis thereof relative to the working table, said longitudinal axis being spaced from said pivoting axis.

4. A machine tool as claimed in claim 1, further comprising an auxiliary table having a thickness corresponding to at least the distance between said working table and a plane face of said tool carrying head carried by the column in a lowermost position of the column relative to said working table, and means for removably securing said auxiliary table on the working table.

5. A machine tool as claimed in claim 1, comprising means for moving said column vertically including a vertical shaft extending longitudinal of the column and rotatable in one direction to raise the column and in the opposite direction to lower the column, a crank mounted on said column for rocking movement about the axis of said vertical shaft, and unidirectional drive means for connecting said crank to said shaft to rotate said shaft in response to rocking movement of said crank.

6. A machine tool as claimed in claim 5, in which said unidirectional drive means includes two ratchet wheels secured on said vertical shaft and having teeth facing in opposite directions, a piece freely rotatably mounted on said shaft, means for connecting said crank to said piece to oscillate said piece about the axis of said shaft in response to rocking of the crank, two driving pawls pivotally mounted on said piece, spring means tending to bias each pawl into operative driving engagement with a respective ratchet wheel, and means for selectively disengaging said pawls from their respective ratchet wheels.

7. A machine tool as claimed in claim 1, in which each of said outer faces of said head has a disc portion and in which the cooperating face on the column has a recess for receiving the disc portion of the selected outer face of said tool-carrying head, further comprising means for extracting said disc portion of the tool-carrying head from said recess.

8. A machine tool as claimed in claim 7, in which said means for removably securing the tool-carrying head on said column include a tie-bolt and said extraction means include a stop on said tie bolt engageable with a cooperating portion of said column.

* * * * *